(12) United States Patent
Barnes

(10) Patent No.: US 7,186,334 B1
(45) Date of Patent: Mar. 6, 2007

(54) COMBINED CHLORINE AND OZONE GENERATOR STERILIZATION SYSTEM

(76) Inventor: Ronald L. Barnes, 2823 Castle Pine Cir., Owens Cross Roads, AL (US) 35763

( * ) Notice: Subject to any disclaimer, the term of this patent is extended or adjusted under 35 U.S.C. 154(b) by 278 days.

(21) Appl. No.: 10/701,310

(22) Filed: Nov. 4, 2003

Related U.S. Application Data

(63) Continuation-in-part of application No. 10/668,504, filed on Sep. 23, 2003, which is a continuation-in-part of application No. 10/636,071, filed on Aug. 7, 2003, now Pat. No. 6,881,331, which is a continuation of application No. 09/794,601, filed on Feb. 27, 2001, now abandoned, which is a continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, and a continuation-in-part of application No. 09/393,437, filed on Sep. 10, 1999, now Pat. No. 6,192,911.

(51) Int. Cl.
*C02F 9/12* (2006.01)
*C02F 9/04* (2006.01)

(52) U.S. Cl. .................. 210/192; 210/218; 210/260; 210/205; 422/186.3; 422/186.12; 250/436; 250/438

(58) Field of Classification Search ................ 250/436, 250/437, 438; 422/24, 186.3, 186.12; 210/192, 210/205, 748, 764, 218, 260; 261/DIG. 42
See application file for complete search history.

(56) References Cited

U.S. PATENT DOCUMENTS

| 5,075,016 | A | * | 12/1991 | Barnes | 210/760 |
| 5,766,490 | A | * | 6/1998 | Taylor et al. | 210/758 |
| 5,785,845 | A | * | 7/1998 | Colaiano | 210/167 |
| 6,277,288 | B1 | * | 8/2001 | Gargas | 210/748 |

* cited by examiner

*Primary Examiner*—Terry K. Cecil
(74) *Attorney, Agent, or Firm*—Mark Clodfelter

(57) ABSTRACT

Water sanitizing apparatus is provided for pools, spas hot tubs and other similar bathing facilities that integrates an ozone generator and a chlorine generator in one unit, in addition to exposing a flow of water to be purified to ultraviolet radiation from the ozone generator for advanced oxidation reactions. In one embodiment, a mixing venturi allows for mixing various substances together prior to insertion into the motive flow. In another embodiment the venturi is constructed as inserts that allow tuning of the venturi for individual systems. In other embodiments, salt is added to a portion of the water flow as a concentrated brine from which chlorine is generated, or the salt may be simply be added to the water of the facility at a much lower concentration and chlorine generated from the flow of water through the apparatus.

15 Claims, 7 Drawing Sheets

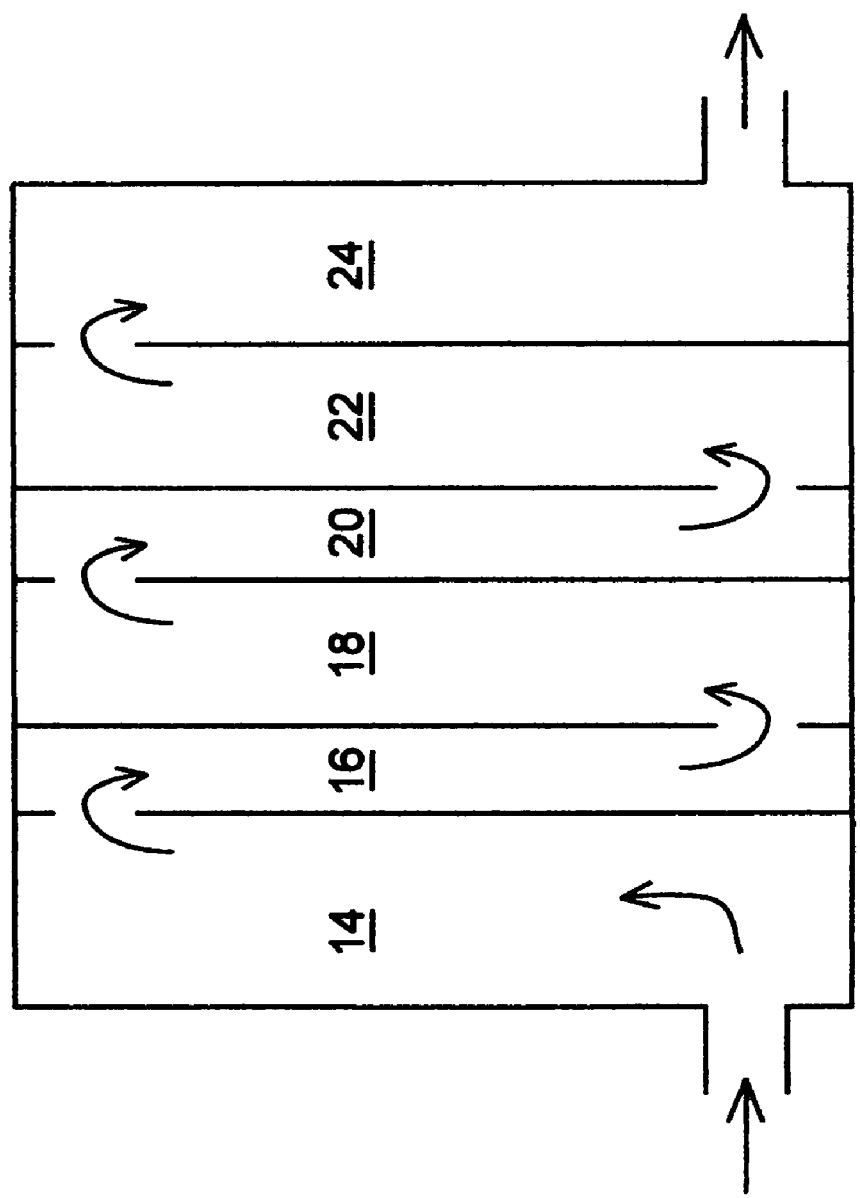

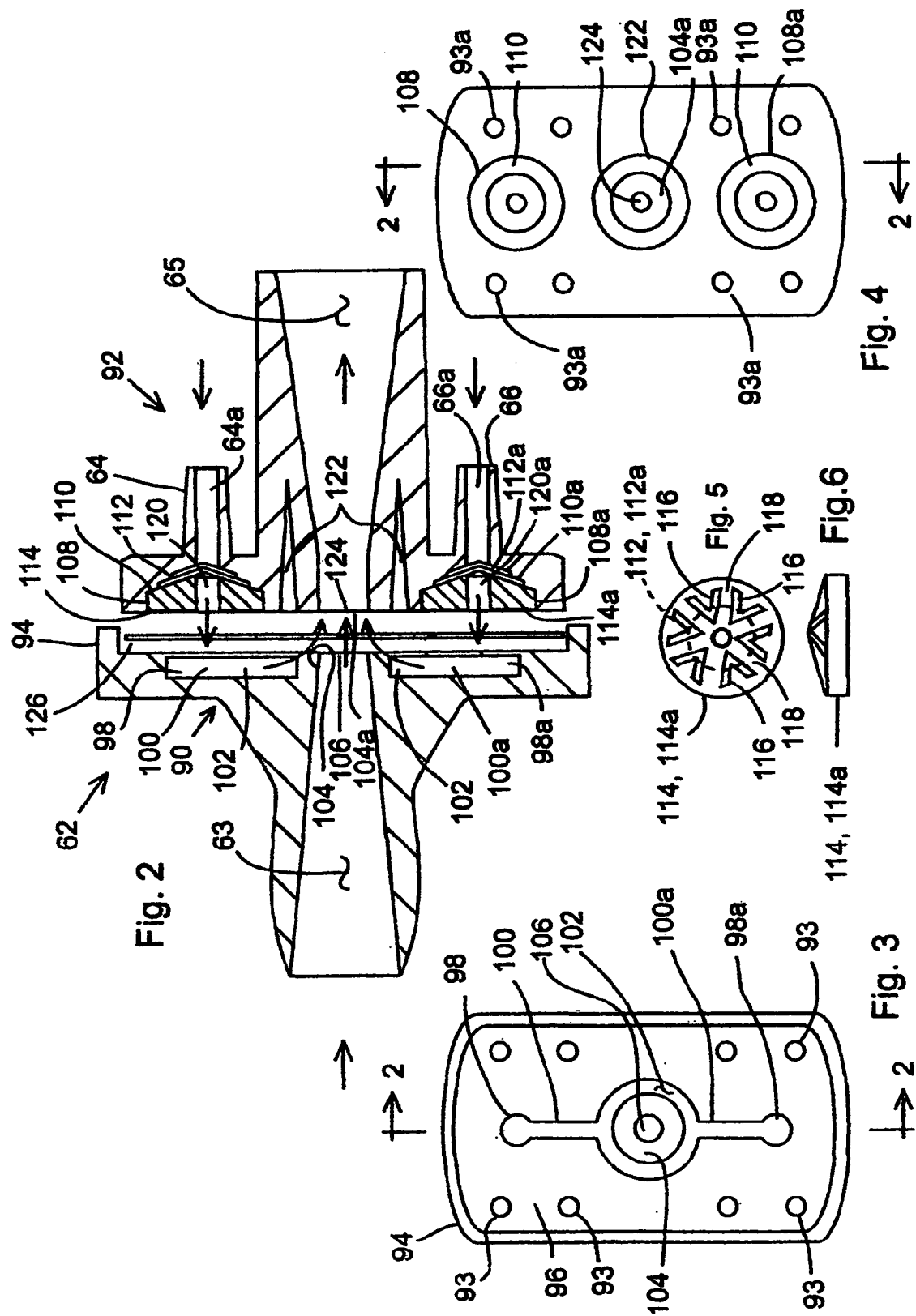

COMBINED CHLORINE AND OZONE GENERATOR STERILIZATION SYSTEM

CROSS REFERENCE TO RELATED APPLICATIONS

This application is a continuation-in-part of Applicant's patent application Ser. No. 10/636,071, filed Aug. 7, 2003, now U.S. Pat. No. 6,861,331 which is a continuation of Applicant's now abandoned patent application Ser. No. 09/794,601, filed Feb. 27, 2001, which is a continuation-in-part of Applicant's application Ser. No. 09/752,982 filed Dec. 31, 2000 now U.S. Pat. No. 6,623,635, issued Sep. 23, 2003, and application Ser. No. 09/393,437 filed Sep. 10, 1999 Applicant's now U.S. Pat. No. 6,192,911, issued Feb. 27, 2001. This application is also a continuation-in-part of Applicant's pending patent application Ser. No. 10/668,504, filed Sep. 23, 2003, which is a continuation-in-part of Applicant's U.S. Pat. No. 6,623,635, issued Sep. 23, 2003, which is a continuation-in-part of application Ser. No. 09/418,915 filed Oct. 15, 1999 Applicant's now U.S. Pat. No. 6,342,154, issued Jan. 29, 2002.

FIELD OF THE INVENTION

This application relates generally to water sterilization systems, and particularly to sterilization systems for swimming pools, hot tubs, spas and similar facilities wherein chlorine for sanitizing purposes is generated from a salt solution in the facility, with ozone being beneficially used to counter sodium developed by the chlorine generation process and to enhance the sanitizing process. In addition, Applicant's invention also treats the water with ultraviolet light.

BACKGROUND OF THE INVENTION

For many years, chlorine has been used as a sanitizer in many types of bathing and recreational facilities such as swimming pools, spas, hot tubs and other similar facilities. Commonly, the chlorine is simply added to the water of such a facility in the form of a liquid, such as a solution of sodium hypochlorite, or in the form of a slow-dissolving solid so as to slowly release chlorine into the water over a period of time. More recently, chlorine is generated directly from the water of the facility itself wherein a quantity of salt is added to the water, with the water then subjected to an electrolysis process in order to obtain the chlorine. In order for this process to function efficiently, the salinity of the water in the bathing facility must be from about 2,000 parts per million to about 20,000 parts per million. Furthermore, during the electrolysis process, sodium hydroxide, a caustic alkaline compound, builds up in the water of the pool or other facility. While the sodium hydroxide may be controlled by addition of acids, such as hydrochloric acid, this forms other salts and undesirably adds to the chemical loading of the water. In other instances where hydrochloric acid is deemed too dangerous to handle, an acid salt may be added to the water, but this also adds to the chemical loading of the water. In both instances, any metals (except noble metals) exposed to the salt water are prone to corrosion from the salt. To overcome these problems, one manufacturer isolates the electrode that produces sodium hydroxide in a tank with a semipermeable membrane that passes electrons so that the sodium hydroxide is isolated from the pool water. However, the semipermeable membrane must be changed periodically, and the resulting sodium hydroxide treated and disposed.

Another manufacturer utilizes a brine tank with the water therein being separate from the pool water. This is a relatively high maintenance system, requiring the brine to be changed fairly frequently, which involves neutralizing the sodium hydroxide therein before disposal. Both of the last two systems are also relatively expensive.

Accordingly, Applicant proposes to combine an ozone generator in conjunction with a chlorine generation system using salt in the water of the facility, the ozone reacting beneficially with the sodium hydroxide developed from the chlorine generation process. In addition, ozone is added to the water of the pool, greatly reducing chlorine requirements.

BRIEF DESCRIPTION OF THE DRAWINGS

FIG. 1a is a diagrammatic view illustrating configuration of flow channels of the embodiment of FIG. 1.

FIG. 2 is a sectional view of a venturi of the present invention taken along lines 2—2 of FIG. 3.

FIG. 3 is an end view of a portion of the venturi showing construction details thereof.

FIG. 4 is an end view of the other portion of the venturi showing construction details thereof.

FIG. 5 is a top view of a plug fitted into the venturi ports.

FIG. 6 is an elevational view of the plug of FIG. 5.

DETAILED DESCRIPTION OF THE DRAWINGS

As noted above, Applicant proposes a combined ozone generator and chlorine generator in an apparatus that efficiently mixes beneficial substances, and treats the water with ultraviolet light. Particularly, when ozone is added to the salt water of a chlorine generation system, it has been found that ozone beneficially reacts with the by-products of the chlorine generation process, most notably sodium hydroxide. It is believed the ozone reacts with the sodium hydroxide and forms a precipitate that is removable by conventional application of flocculants and filtering. In any case, the sodium hydroxide loading of a pool utilizing a chlorine generator using salt has been found to be reduced beyond what would otherwise be expected when the water thereof is not treated with ozone. In addition, ozone added to water of swimming pools, spas and the like greatly reduces chlorine or other sanitizer demand, further decreasing the corresponding quantity of sodium hydroxide.

Figure 1:
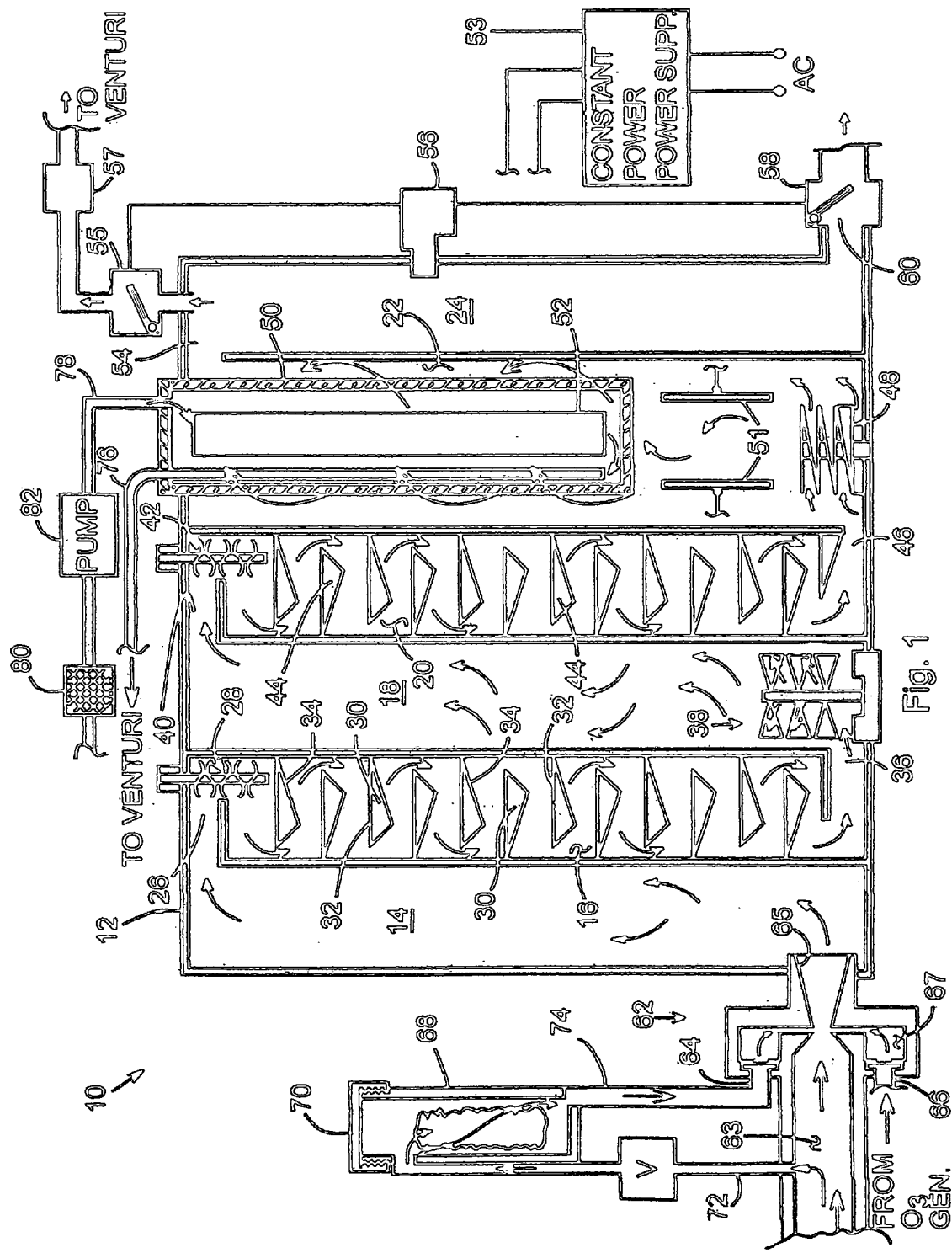
FIG. 1 is a diagrammatic cut-away view of one embodiment of the invention.

Such a combined chlorine generator and ozone generator, by way of example, is shown in FIGS. 1 and 2. The embodiment of FIG. 1 is based on a water sanitizer as described in Applicant's patent application Ser. No. 10/636,071. As stated, this embodiment is primarily intended to be used in conjunction with spas, hot tubs and similar bathing facilities that utilize electrolysis of salt for chlorine generation.

Referring now to FIG. 1, the instant inventive assembly for purifying water is referred to generally by reference arrow 10. The major components and compartments of assembly 10 may be, but not necessarily, constructed integrally with or housed within a rigid casing 12. In some instances, access to an interior, as where servicing or cleaning is occasionally needed, of apparatus 10 may be provided by making one side removable, and sealably mounted in place. Such a casing 12 may be rectangular or square, as seen from a side, and relatively narrow in width so as to be conveniently mountable within a spa or hot tub enclosure. In this application, a casing about 18 inches high, 18 inches or so in width and 2–3 inches in thickness has proved to function well. Conveniently, the compartments may be formed by a linear extrusion process wherein the extrusion is cut every 2–3 inches or so in length and capped on each side. In this instance, the internal structures for directing water flow may be inserted from ends of the compartments, and mounted to end caps for each compartment, or as stated one side may be sealed and the internal components mounted therein, after which the other side may be removably and sealably mounted in place.

Referring further to FIG. 1, assembly 10 is shown having a number of compartments 14, 16, 18, 20, 22 and 24, each of these compartment communicating with adjacent compartments via openings at tops and bottoms thereof so that the flow of water, as indicated by arrows, traverses the full length of each compartment. As shown in FIG. 1a, those compartments wherein water is flowing upward may be larger in cross section or diameter, and compartments wherein water flows downward may be smaller in cross section or diameter. Here, where the flow is upward, the flow is slower, allowing ozone in the bubbles a longer time to dissipate in the water. In those compartments where the flow is downward against the natural buoyancy of the bubbles, the compartments are smaller with a corresponding increased flow of water that entrains the bubbles in a faster, more turbulent flow in order to prevent bubbles from combining and forming air cavities at the top of those narrower chambers.

Initially, in FIG. 1, compartment 14 serves as a contact chamber wherein bubbles containing ozone are first exposed to the water. Where compartment 14 is larger (FIG. 1a), the contact time is more prolonged due to the flow being slower through the larger compartment. In addition, particular structures located in the compartments where the flow is downward or at entrances/exits thereof ensure that water flow is turbulent.

With respect to these structures, at an entrance 26 of compartment 16 may be mounted a static mixer assembly 28, as shown and described in Applicant's U.S. Pat. No. 6,623,635, which is incorporated herein by reference in its entirety. Assembly 28 serves to generate turbulence in the flow of water for reasons earlier described. Within compartment 16, there may be mounted a plurality of baffles 30 mounted at one edge 32 thereof to the inner walls of the compartment, which baffles having an opposite edge 34 angled or bent downward with respect to edge 30. With this construction, and as shown by arrows, the downward water flow through compartment 16, a narrower compartment, is faster and is forced to take a circuitous path around baffles 30, extending the contact distance and generating turbulence in the flow of water to cause further diffusion of ozone and mixing of ozone and sanitizer into the water. Where an extrusion is used to form the compartments, baffles 30 may be mounted to a strip or rod. Alternately, a free-standing structure, such as a plurality of spheres having openings cut therein, may be placed in compartments wherein turbulence and extended contact distance is desired.

At the bottom, of compartment 16 is a combination water exit/entrance 36 where the water exits compartment 16 and flows into compartment 18. Just as the flow of water enters compartment 18 it may encounter a water-directing assembly 38 that entrains the water to flow upward with a circular, spiraling motion, preventing laminar flow from developing and allowing more diffusion of ozone to occur. As stated, compartment 18 may be larger in cross section or diameter, allowing a prolonged contact distance as earlier described for compartment 14.

At an upper end of compartment 18, a combined water outlet/inlet 40 passes the water from compartment 18 to compartment 20. As the water flows into compartment 20 from outlet/inlet 40, it may encounter a static mixer assembly 42 as described for static mixer assembly 28. Once in compartment 20, which may be a smaller compartment with faster flow, the flow of water is again forced to follow a circuitous path around baffles 44 constructed as described for baffles 30, and which may be mounted to sides of the compartment (or to an end cap) and extended inward to direct the flow of water in a circuitous and turbulent manner.

At a bottom of compartment 20, which may be a larger compartment with slower flow, a water exit/inlet 46 is provided to pass the flow of water from compartment 20 to compartment 22. Here, as the water flows into compartment 22, it may encounter a second water-directing assembly 48 that directs the upward flow of water along a circular, spiral path. Alternately, the flow of water may be introduced into compartment 22 at an angle so as to induce a spiral motion to the water flowing through compartment 22.

Also positioned in compartment 22 is a watertight, sealed enclosure 50 within which an ultraviolet light-emitting lamp 52 is mounted or otherwise positioned. Lamp 52 is conventionally powered, as by a ballast connected to AC power and to the lamp. Watertight and airtight conductor connections through enclosure 50 would typically be employed. Enclosure 50 forms a portion of the ozone generator of the instant invention, as will be described hereinafter. Significantly, the walls of enclosure 50 are of a transparent, ultraviolet-transmitting material, such as, but not limited to, quartz, which passes the ultraviolet radiation to the water. In this compartment, water is forced to move in a spiral around enclosure 50 while being exposed to ultraviolet light. This exposes any pathogens that may have survived to that point to lethal levels of ultraviolet radiation, and disassociates any residual ozone in the water into diatomic oxygen and free oxygen. Of course, the free oxygen is highly reactive, and reacts with practically any compound in the water almost instantaneously.

Also shown mounted in compartment 22 are a pair of plates 51, which are constructed of conductive metal resistant to corrosion and galvanic metal transfer, and may be plated with a noble metal. Plates 51 are mounted within compartment 22 in generally parallel relationship, and are coupled by insulated wires to a power supply 53 that provides constant power in the form of DC potentials to plates 51. These potentials may be on the order of from about 3 to 20 volts at a current of from about 1–10 amps, which is generally consistent with the potentials found in chlorine generation systems. Thus, with an appropriate quantity of salt added to the water of the spa, tub or other facility, free chlorine is generated in compartment 22 in proportion with the amount of salt dissolved in the water. The rate of chlorine generation in general is such that most of the chlorine immediately diffuses into the water.

While the reactions between ozone, sodium hydroxide and chlorine are complex and not completely understood, the net result is a precipitate that binds the sodium hydroxide and contaminants in the water. In addition, these reactions may produce compounds that have a negative oxidation potential that may kill microbiota and further beneficially react with contaminants in the water.

At a top of chamber 22 is a water outlet/inlet 54 that passes the flow of water to the last compartment 24. Structure herein is similar to that shown and described in Applicant's U.S. Pat. No. 6,342,154, and which is incorporated herein in its entirety by reference. Such structure removes entrapped air from the flow of water. Here, at a top of chamber 24, a solenoid valve 55 operates in conjunction with a water level sensor 56 and, in some instances, a valve 58 is positioned at an outlet 60 of assembly 10. A small drain chamber 57 may be provided in the vent line after valve 55 in order to trap and drain small amounts of water expelled through valve 55. Operation of valves 55, 58 and sensor 56 may generally be such that when sensor 56 detects a lowered water level indicative of a gas buildup within compartment 24, a signal is sent to valve 55 to open this valve, thus venting the gas. In instances where the water system is pressurized, water pressure forcefully expels the gas through valve 55. In some of these pressurized systems, where the water pressure is sufficiently high to expel gas through valve 55, valve 58 may be omitted. In instances where the water pressure is somewhat lower, a small constriction may be provided that an exit 60 in order to cause the gas to be expelled through open valve 155. In other of these pressurized systems where valve 58 is installed, valve 58 may be closed when valve 55 is opened. In this instance, pressure in the system increases to more forcefully expel gas through valve 55. In any instance, after the water level rises (due to the gas is being expelled) to a preset point where the water level almost reaches valve 55, sensor 56 closes valve 55. In order to prevent gas buildup in compartments with low flow rates, such as compartment 14, a small vent line may be installed from the top of the compartment to a top of compartment 24. This line would be sized so as to readily vent gas, but not allow passage of a significant quantity of liquid to pass therethrough. In some instances, it may be desirable to pass the built-up gas back to the venturi, as indicated, or alternately back to the inlet of the ozone generator, thus closing the system and preventing outgassing by causing the outgas to be re-dissolved into the water.

In other systems, such as gravity-operated flow systems, pressures in the assembly 10 are not as high. In this instance, valve 58 would be shut as valve 55 is opened by sensor 56. In these systems, when this occurs, the entire system would experience a drop in pressure, and a corresponding increase in pressure when valve 55 is closed and valve 58 is opened. Such pressure fluctuations are beneficial due to ozone diffusing more rapidly into the water when the pressure is higher. As a result, more ozone diffuses into the water sooner to develop initial higher concentrations of dissolved ozone.

Still referring to FIG. 1, another feature of Applicant's invention may include premixing ozone gas with another sanitizing compound prior to insertion of the mixed compounds into the flow of water. Here, a venturi injector 62 similar to a venturi injector as shown and described in Applicant's U.S. Pat. No. 6,192,911 and which is incorporated herein in its entirety by reference. This venturi 62 is conventionally provided with a water Inlet 63 and a water outlet 65 through which a motive flow of water (as indicated by arrows) is pumped by a water pump (not shown). Venturi 62 is also provided with an annular cavity 67 (diagrammatically illustrated in FIG. 1) which in turn communicates with at least two injection ports 64 and 66. As shown, port 64 may be coupled to a canister 68 having a removable top 70 within which a solid, slowly dissolving form of neutralizing agent for neutralizing sodium hydroxide levels developed by the chlorine generation process, or any other beneficial compounds, such as a flocculent, may be placed at appropriate intervals. An inlet line 72 provides a flow of water via a valve 73 from the motive flow to canister 68, where the compounds are dissolved into the water, and an outlet line 74 provides the water containing the dissolved compounds to suction port 64 of the venturi. Valve 73 is used to meter the flow through canister 68. Inlet suction port 66 of the venturi is coupled to an outlet tube 76 of enclosure 50 through which air is circulated around ultraviolet tube 52. To accomplish this, an inlet tube 78 is provided to enclosure 50. An air filter 80 may be coupled in line 78 to filter particulates from air circulated through enclosure 50. In some instances, an air pump 82 may be also placed in line 78 to pump air through enclosure 50. In this instance, the pump provides basically a constant rate of air flow through the ozone generator to the suction port 66 of the venturi. In any case, ozone-containing air from enclosure 50 is provided to port 66 of venturi 62, where the ozone-containing air is mixed with the compound-containing water from canister 68 in annular chamber 67 of venturi 62. Alternately, any liquid dispenser may be used in place of canister 68 to provide the compounds to the venturi. Also, offgasses from chamber 24 may be connected back to the venturi, as through a third suction port or by providing an air line and T connection with either of lines 76 or 78. Where pump 82 is used, a check valve may be used to prevent ozone from being pumped into chamber 24, although water pressure in chamber 24 should prevent water from being passed to the ozone generator. Where this may occur during startup, a check valve may be used that passes gas but not water.

Figure 1B:
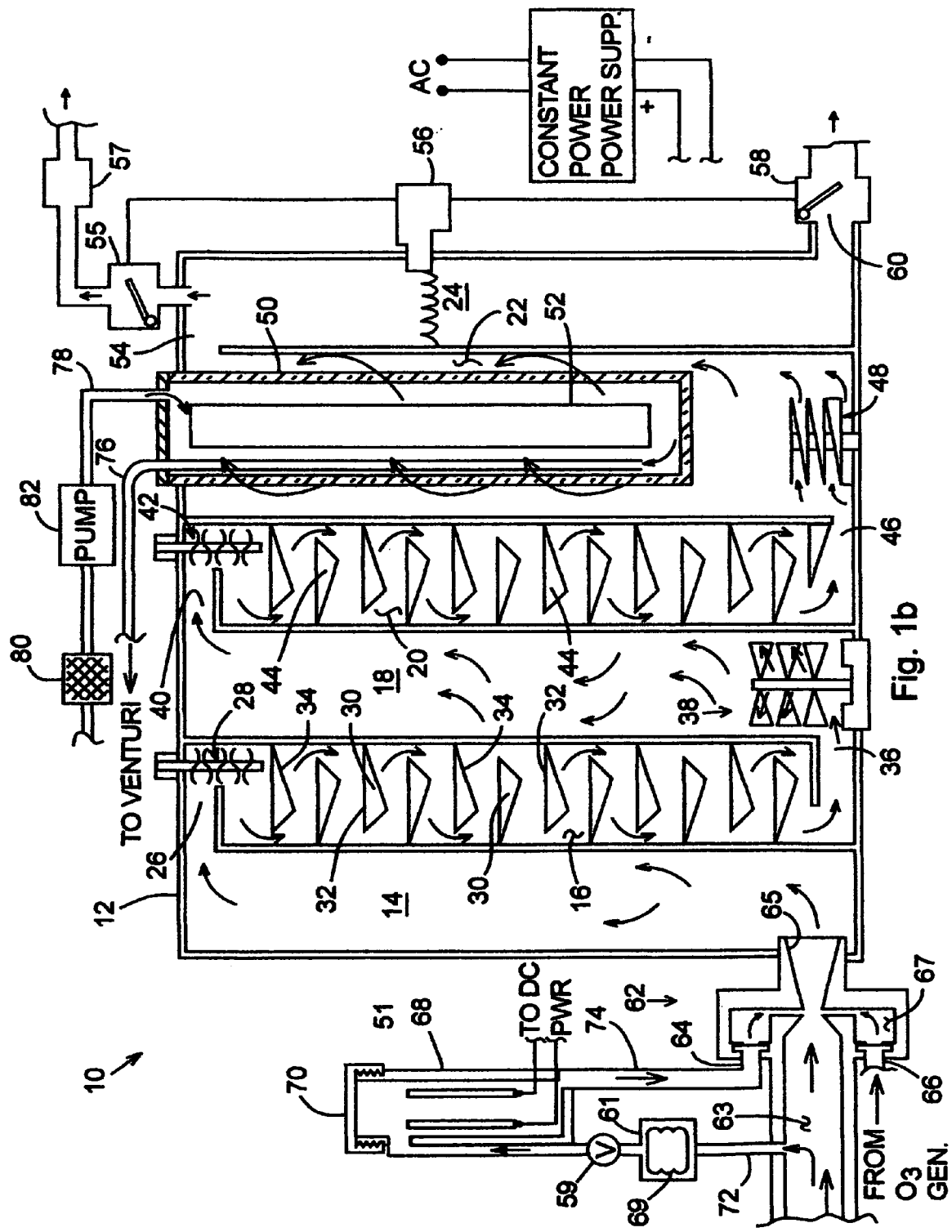
FIG. 1b is a diagrammatic cut-away view of another embodiment of the invention.

In another embodiment, and as shown in FIG. 1b, the plates 51 for generating chlorine may be mounted in enclosure or compartment 68 separate from the flow through apparatus 10. In this embodiment, a valve 59 may be located in either of lines 72 or 74, and used to meter flow of water through the compartment 68. Instead of adding the salt directly to the water, salt may be in the form of a slow-dissolving block 69 in a compartment 61 mounted in the water flow to compartment 68. In this embodiment, valve 59 may be positioned in line 72 in the flow before tank 61, and used to meter a slow flow of water through tank 61. This concentrates the salt from block 69 into a concentrated brine, which is then passed to compartment 68 for chlorine generation. In this embodiment, it is unnecessary to seed the water of the facility with salt, as a concentrated brine is present in compartment 68 that is slowly passed through the venturi into the water of the facility. Alternately, another compartment similar to compartment 61 may be located in water line 74, and contain a slow-dissolving substance that neutralizes the sodium hydroxide developed by the chlorine generation process in compartment 68. Further, the embodiments of FIGS. 1 and 1b may be scaled so as to be utilized with larger facilities, such as swimming pools.

The various embodiments of FIGS. 1 and 1b of the present invention may be plumbed into a water system of a spa or hot tub in any manner suitable for its use. In one instance, the combined chlorine generator/ozone generator sanitation apparatus may be coupled at outlet 60 to a suction line of a pump, with the inlet line 63 coupled to draw water from the spa or tub, or to a filter drawing water from the spa or tub. In a different plumbing scheme, the inlet 63 may be coupled to the output of a pump, with the outlet 60 coupled to provide sanitized water back to the spa or tub. In yet another plumbing scheme, a bypass plumbing scheme may be used wherein pressurized water from the filter is applied through the inlet 63, with the outlet 60 coupled to provide the sanitized and treated water back to the suction side of the pump. As should be apparent from Applicant's disclosure, any plumbing scheme may be used that allows the apparatus of FIGS. 1 and 1a to be used in their intended manner.

A multiport venturi 62 as contemplated by the present invention is more particularly described in FIGS. 2–6. Here, it is seen that venturi 62 is constructed in two portions or halves, an inlet portion 90 and an outlet portion 92. Nut/bolt pairs (not shown) extend through 8 pairs of aligned openings 93, 93a in each of portions 90, 92, and hold portions 90, 92 together while allowing disassembly thereof, as will be further explained. As shown, a flange 94 extends around a periphery of a body of inlet portion 90, flange 94 defining a cavity 96 therearound. As shown in FIGS. 2 and 3, small cavities 98, 98a may generally receive dissimilar compounds from their respective inlets 64, 66, and channels 100, 100a carry the compounds to an annular mixing cavity 102 where the dissimilar compounds are mixed. After being mixed, the compounds are drawn by venturi action across a flat venturi interface 104, as will be further explained, and into the motive flow of water flowing through opening 106.

The outlet portion 92 is provided on an external side with inlets 64 and 66 for supplying liquid and/or gaseous substances to the venturi. This may be the same substances applied to each of inlets 64, 66 or dissimilar substances may be applied to inlets 64, 66 as described above. In the latter instance, the dissimilar substances are at least partially mixed prior to being introduced into the water flowing through the venturi. Of course, inlets 64, 66 may be located on the inlet portion 90 with appropriate modification, and more than 2 inlets may be provided to the mixing chamber, as should be apparent to one skilled of the art. Inlets 64, 66 each communicate with respective cavities 108, 108a, these cavities provided with stepped regions 110, 110a where the cavities are reduced to a smaller diameter. Within the smaller diameter areas the cavity is tapered as shown toward inlet bores 64a, 66a and the respective openings through which sanitizing compound flows. Within the smaller-in-diameter and tapered portions of cavities 108, 108a disks 112, 112a of a thin, flexible material are placed, these disks serving as check valves to allow only a one-way flow through inlets 64, 66. As these disks 112, 112a must move slightly within their cavities, the cavities are constructed slightly thicker and larger in diameter than the disks. For holding disks 112, 112a in place, plugs 114, 114a are provided, as particularly shown in FIGS. 5 and 6. These plugs are sized to snugly fit as shown into the larger portions of cavities 108, 108a and loosely hold disks 112, 112a in place. These plugs each are provided with a series of ridges 116 forming a plurality of grooves 118 in faces of the plug facing disks 112 (dashed lines in FIG. 5). As such, when substances are flowing through the inlets 64, 66, the disks are moved away from the internal openings of the bores 64a and 66a and generally pressed against the grooves of plugs 114, 114a. As the disks are smaller than the radial extent of the grooves 118, liquids and gasses flow around the disks, into grooves 118 and through a central opening 120, 120a in the plugs. Openings 120, 120a in the plugs communicate via slots 100, 100a with annular mixing chamber 102, where the substances are mixed and drawn into the venturi interface. While substances are drawn rapidly through the venturi ports and into the mixing cavity 102, many mixing reactions occur so fast that the reaction products cause other reactions before being drawn into the motive flow of water.

Additionally provided in outlet portion 92 is an annular cavity 122 surrounding opening 124 through which the motive flow of water flows from opening 106 of inlet portion 90. Together, annular cavities 102 and 122 form the mixing cavity 67 diagrammatically shown in FIG. 1. A venturi interface 104a is located proximate venturi interface 104 of inlet portion 90, this dimension determined by thickness of a gasket 126 fitted between the inlet portion and outlet portion. Thus, the venturi may be adjusted for differing rates of flow by placing a gasket of appropriate thickness between the two portions. Here, where the flow rate is higher, a thicker gasket may be used, which in turn draws more liquid or gaseous compounds into the venturi, and where the flow rate is lower, a thinner gasket may be used, which in turn draws less into the venturi. Of course, openings are cut in the gasket to allow flow of liquids and gasses therethrough and to allow motive flow of water through the gasket. Additionally, slots in the gasket may be cut along slots 100, 100a to allow liquids and gasses to more fully be mixed in both annular chambers 102 and 122.

Figure 7:
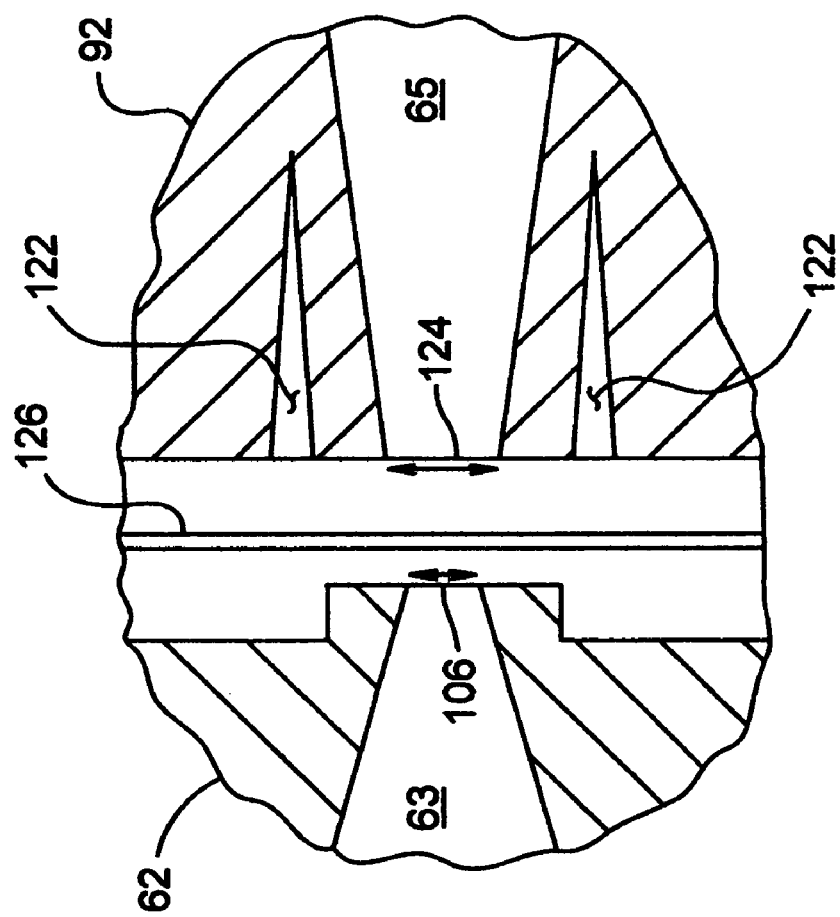
FIG. 7 is a cut-away view of a portion of the venturi showing exaggerated size of an opening 124.

In another embodiment of the venturi, and referring to FIG. 7, the opening 106 of water inlet 63 is slightly smaller, on the order of a few thousandths of an inch or so, than opening 124 of water outlet 65. It has been found that with opening 124 being larger, suction at the venturi ports 64 and 66 is greatly increased, and the venturi will draw more liquids and gasses into the motive flow of water. In some instances, 2 to 3 times as much of a gas or liquid may be drawn through the ports 64 and 66 just by increasing size of opening 106. Of course, the interior sides of the water outlet are tapered as shown away from opening 106. It is believed that by making opening 106 larger, more accommodation is provided for the extra volume of substances drawn in through the suction ports. In yet another embodiment, the material from which the venturi itself is constructed, particularly the outlet portion 92, may a relatively flexible material. This causes the interface region of outlet portion 92, particularly around opening 124, to be forced outward (to the right in FIG. 7) slightly under pressure from the motive flow. This in turn causes the gap through which liquids and gasses are drawn to become larger, on the order of a few thousandths of an inch or possibly somewhat more, drawing more liquids and gasses through the gap and maintaining a ratio of gasses and liquids to the quantity of motive flow to remain relatively constant with different motive flow rates through the venturi. In this embodiment, the gasket 126 may be of a relatively soft, flexible material, such as a dense closed cell sponge, with the venturi portions 62 and 92 assembled so as to compress the sponge relatively hard. Thus, when portion 92 expands outward, the sponge expands and maintains the seal between sealed portions of the interface. In this embodiment, thinner or thicker gaskets may still be used to adjust the basic size of the gap.

While a number of features are shown in assembly 10, it is to be understood that a system with fewer features may be implemented, as should be apparent to one skilled in the art. For example, a viable system may include contact compartment 14, a single turbulence compartment 16 and an ozone generator/reaction chamber 22. Further, in some systems, the gas removal compartment 24 may be omitted. In other systems, a conventional venturi may be used to inject ozone, with other being conventionally dissolved in the water. Further yet, fewer turbulence-inducing assemblies may be employed. In venturi 62, and as stated, multiple ports (more than two) may be constructed therein, and the venturi itself may be scaled in size, in addition to adjusting the venturi gap depending on the flow.

Figure 8:
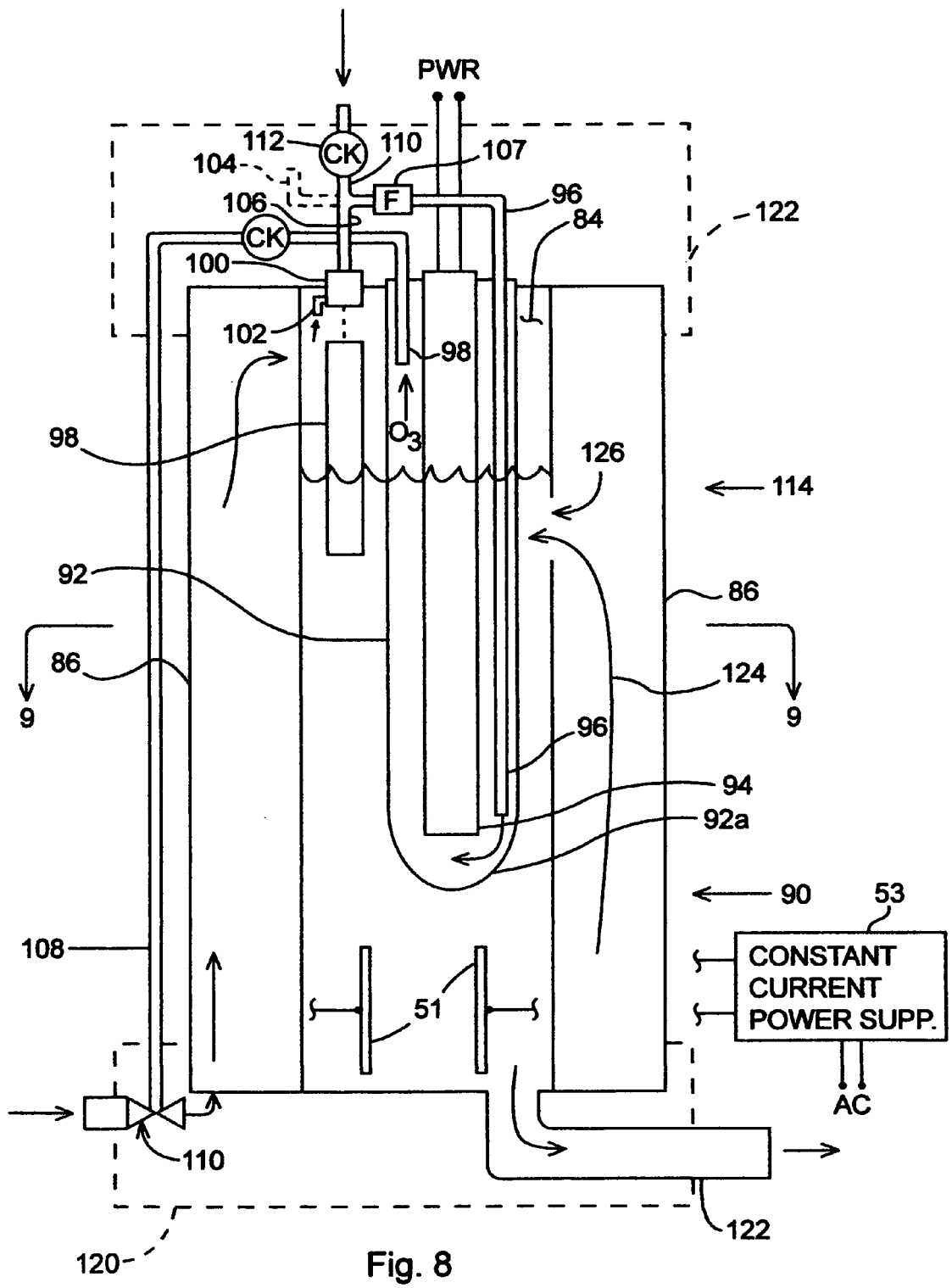
FIG. 8 is a diagrammatic cut-away view of another embodiment of the invention.
Figure 9:
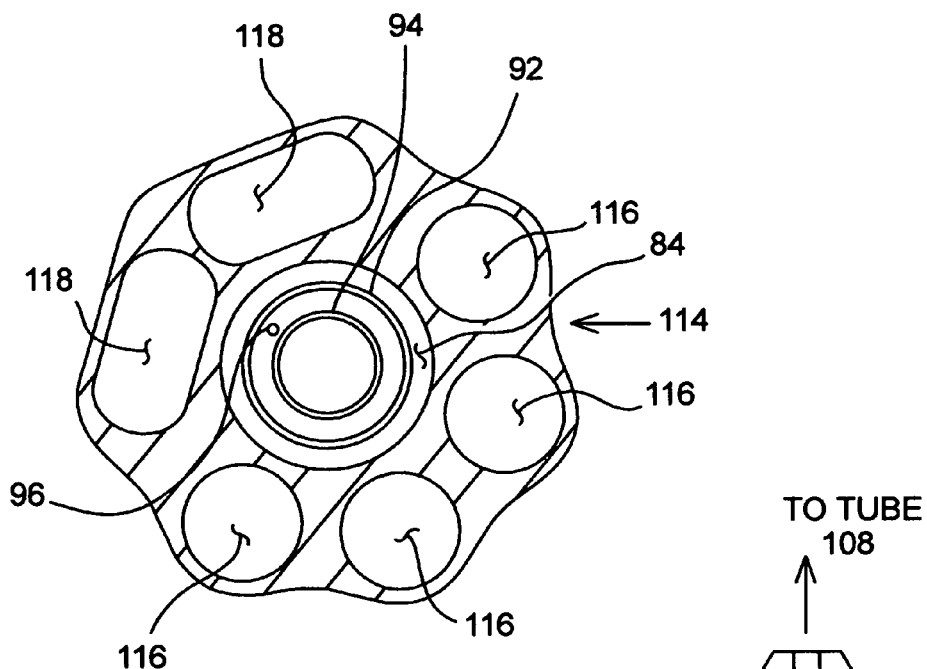
FIG. 9 is a sectional view taken along lines 9—9 of FIG. 8.

In yet another embodiment of the invention primarily intended for swimming pools, and referring to the block or schematic diagram of FIGS. 8 and 9, a water purifier 90 is shown wherein a quartz tube 92 closed at an end 92a is mounted within hollow region 84 formed by a circular arrangement of the tubes, as shown in the cross-sectional view of FIG. 9. As described for FIGS. 1 and 1a, a housing 86 for the apparatus may be formed by an extrusion process so that counterflow tubes 116 (FIG. 9), elongated tubes 118 and the central region 84 are formed in the extrusion. For a swimming pool, it is anticipated that the extrusion may be cut every 4.5 feet to 5 feet or so, forming a housing 86 allowing for use of an ultraviolet tube up to 4 feet or so in length. Of course, a shorter embodiment may be constructed about 3 feet or so in length, allowing use of a 24 inch ultraviolet tube. Openings 116 may be from about 1.5–3 inches or so in diameter to accommodate the higher flow rates necessary for a swimming pool. Openings 118 may be used to mount electronic controls and ballast for the ultraviolet lamp, or in one alternate configuration the ultraviolet lamp and quartz envelope may be located in one of openings 118. In use, the apparatus may be mounted vertically on a base 120, shown in dashed lines, or configured to work in a horizontal position. Here, the enclosure may be oriented so that one of elongated openings 118 is vertically positioned with respect to its cross section, and a float arrangement mounted therein so as to maintain a water level at about ½–⅔ of the elongated dimension of the opening 118. Alternately, the bubble removal chamber may be left out entirely.

An ultraviolet lamp 94 is mounted within a quartz (or other ultraviolet transmissive material) tube 92 so as to produce ozone within the tube 92 and to provide ultraviolet radiation to the surrounding water in a similar manner as shown in FIGS. 1 and 1a. Lamp 94 may be mounted within the hollow region 84 formed by tubes 69 so as to be removable for replacement and to seal the tube with respect to any water leaks that may occur, which otherwise may present a dangerous shock hazard, and is conventionally powered, as should be apparent to one skilled in the art. An air inlet tube 96 may extend as shown along most of the length, i.e. more than halfway, of the ultraviolet tube 94, and provides a flow of air to the interior of tube 92 beginning at a point generally furthest from a tube 98 from which ozone-containing gas is drawn. This construction allows air containing oxygen to be moved generally the length of lamp 94 in order to maximize the amount of ozone produced.

In addition to an ozone and ultraviolet-producing apparatus mounted within hollow region 84, a bubble separator generally as described above, generically shown as a float 98 and float valve 100, may also be mounted in hollow region 84. Valve 100 is constructed so as to vent air from hollow region 84 responsive to float 98 rising to a point that opens valve 100. Air so vented passes from hollow region 84 via a tube or aperture 102. Float 98 and valve 100 may be configured as described above so as to produce a hysteresis effect wherein the water level cycles between a high point almost fully submerging tube 92 to a low point wherein tube 92 is almost fully exposed to gas in hollow region 84. This embodiment may be used in an enclosed area, such as in conjunction with an indoor pool in order to prevent ozone from being expelled into the air. This ozone destruction occurs when the water level falls, exposing the gas in region 84 void of water to ultraviolet radiation. Here, tube 92 blocks most of the 185 nm wavelength of the ultraviolet light, the wavelength that creates ozone, and passes the 254 nm wavelength, the wavelength that disassociates ozone into molecular oxygen and a free atom of oxygen. In outdoor or other environments where minor outgassing is not a concern, the float 98 and valve 100 may be configured to maintain a relatively constant level within hollow region 84 and the gas released by bubbles simply vented to atmosphere, as illustrated by dashed line tube 104 shown connected to expel gasses from float valve 100.

Where a closed loop system is desired, the gas developed from bubbles within chamber 84 is provided via tube 102 and valve 100 to a tube 106 coupled to tube 96 within ultraviolet transmissive tube 92. As stated, air that may contain ozone and free atomic oxygen is then passed the length of ultraviolet lamp 94 and drawn from within tube 92 via outlet tube 98, which in turn is coupled to a tube 108 coupled to a suction port of a venturi 110, recycling the ozone and free atomic oxygen. Of course, as the ozone (and other gasses) diffuses into water flowing through the apparatus and depletes net gasses in the system, additional air is admitted into the system via tube 110 commonly connected to tubes 106 and 96. An air filter 107 may be included in line 110, or in line or as shown between lines 106 and 96, to filter outside air, greatly reducing cleaning requirements of an interior of quartz tube 92. As there is some pressure within chamber 84, a check valve 112 prevents water from being expelled from hollow region 84. Thus, during operation, air is almost constantly being drawn through check valve 112 into ultraviolet-transmissive tube 92 via tube 96 by venturi suction applied to tube 108.

It is to be appreciated that the body 114 of the apparatus may be scaled to a size conducive for use in a spa or hot tub, and is also an extrusion as shown in FIG. 9 that is simply cut to an appropriate length, such as 18 inches of so, with water flow tubes 116 surrounding hollow region 84 being perhaps ½ to 1 inch or so in diameter. For larger applications, and as stated, a larger diameter extrusion with water flow tubes 116 of up to 2 inches or so in diameter may be used, and may further be from about 2 to 5 feet or so in length. For an even larger application, such as a commercial waste water treatment system, flow tubes may be up to 3 inches in diameter and about 4–8 feet in length. In this instance, the total flow through the system may be divided between a plurality of units. As described above, mixing devices for inducing turbulence may be mounted in any of the water flow tubes. Also, in the instance where an extrusion is used to configure the structure, the inner walls separating two adjacent water flow tubes may be eliminated to form a single compartment, such as compartments 118. Such compartments 118 are suitable for housing electrical and other control components of the system, such as timers and lamp drivers. In this instance, these two combined tubes would be isolated from the water flow. Alternately, the bubble separator, ozone generator or both may be mounted in a respective one of compartments 118, with the control electronics and lamp drivers being in hollow central region 84. Of course, in this instance, no water would be present in the hollow central region. In yet another embodiment, a brine chamber, such as a brine chamber 68 (FIG. 1) may be constructed in one of elongated tubes 118, and configured to function in any of the embodiments as described for FIG. 1b. In this instance, the ozone generator may be located either in the hollow central region 84 or in the other of the elongated tubes 118, and be configured to function in a similar manner as the embodiments of FIGS. 1 and 1b.

Figure 10:
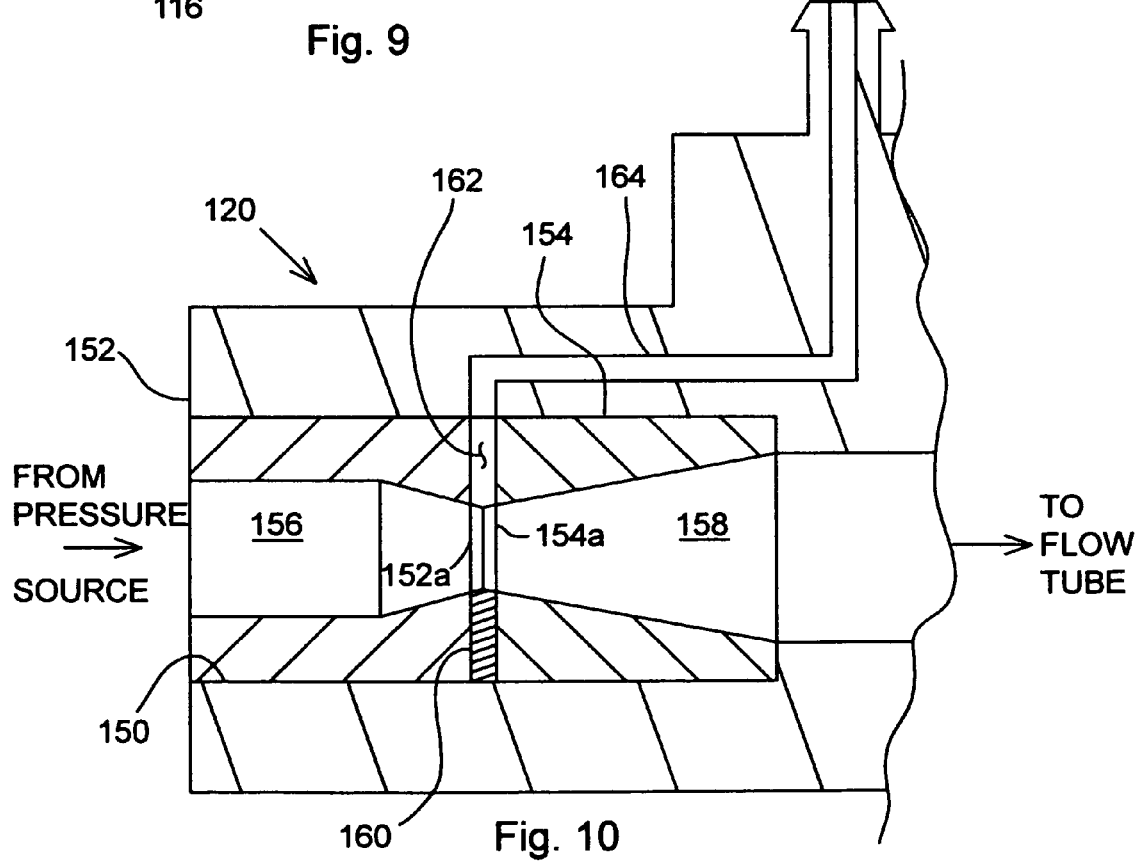
FIG. 10 is a cut-away view of another embodiment of a venturi wherein the venturi portions are constructed as inserts.

A base 120, illustrated in dashed lines, serves to cap a bottom end of body 114 and is integrally constructed to contain venturi 110 and a water outlet 122. Here, as shown in FIG. 10, the venturi may be formed by providing a relatively large bore 150 at the water inlet, and providing a pair of inserts 152 and 154 within the bore, insert 152 containing an inlet portion 156 and insert 154 containing the outlet portion 158. The inserts may be separated by a disk 160 having a passageway, slot or opening 162 communicating with passageways 164, which in turn is attached to suction tube 108. Such a construction has the advantage of being able to adjust or tune the venturi in accordance with water flow through the apparatus by replacing the disks and inserts with other disks and inserts having differently sized conical hollows in order to alter the operational characteristics of the venturi. In addition, the embodiment as described above may be advantageously implemented simply by selecting an insert 154 having an opening 154a that is slightly larger than the opening 152a in insert 152. Alternately, a venturi similar to a venturi such as described in Applicant's U.S. Pat. No. 6,192,911, issued Feb. 27, 2001, may be simply attached to base 120 to provide a flow of water mixed with ozonated air to the first contact tube. The outflow from the venturi is channeled by base 120 into a first of water flow tubes 69 that serves as the initial contact flow tube as described above.

A top cap 122 (dashed lines in FIG. 8) cooperates with channels in base 120 to channel flow of water from a first contact flow tube 69 through the rest of the flow tubes serially and alternately in upward and downward directions. As with the base, any check valves and channels for channeling air, as well as any seals required for sealing the ozone generator against possible water leakage, may be incorporated into the top cap 122. Likewise, tube 108 carrying ozonated air may be cast into the extrusion forming the body 114 of the apparatus or provided as an exterior tube.

In a last flow tube 69, and again referring to FIG. 8, and as illustrated by arrow 124, an opening 126 admits the flow of water to the hollow region 84. Here, as this compartment may be larger than the flow tubes, thus having a slower water flow therethrough, any bubbles in the flow rise to the surface and into the void above the water level. Gases from hollow region 84 and outside air from check valve 112 are then drawn by venturi suction as described through the ozone generator formed by tube 92 and lamp 94 and subsequently into venturi 110.

In an embodiment incorporating a chlorine generator, and referring to FIG. 8, the ozone generator in region 84 may be shortened, and electrically conductive plates 51 as described for the embodiment of FIG. 1 may be mounted below the ozone generator. These plates 51 are coupled to a constant power power supply 53 to energize plates 51 with the potentials and current flow described above. Chlorine is produced by electrolysis from salt added to the water, and diffuses thereinto directly from the plate producing the chlorine. To counter a buildup of sodium hydroxide, a dispenser of a compound, preferably slow-dissolving as described in the foregoing, may be incorporated in a one of the flow channels, or in one of the elongated tubes 118 (FIG. 9). As described, one of the flow channels may be configured as a brine chamber into which water is slowly metered to form a concentrated brine prior to being passed into a tube or hollow central region containing plates 51.

In operation, water from a spa, hot tub, jetted tub, pool or the like is initially pumped by a pump (not shown) through venturi 110 which provides ozonated air, possibly mixed with other substances, to the water, after which the water is directed into the first contact flow tube by a channel constructed in base 120. The water flow is then directed by channels in the base and top cap sequentially upwardly and downwardly through the flow tubes until entering the hollow region 84 from the last flow tube. There, bubbles are separated and the separated gasses drawn back through the venturi, or through the ozone generator, along with air from check valve 112. As stated, any ozone present in the water or air in hollow region 84 is disassociated, promoting advanced oxidation reactions that destroy harmful components in the water. Further, such disassociation of the ozone largely prevents outgassing in an indoor facility, the free oxygen that is released reacting almost instantly with any compounds in the water. In addition, pathogens or other undesirable microbiota that may survive until reaching the flow tube containing the ozone generator are killed by exposure to ultraviolet light.

Having thus described my invention and the manner of its use, it should be clear from Applicant's disclosure to those skilled in the art that incidental changes may be made that fairly fall within the scope of the following appended claims, wherein I claim:

1. A water sanitizer for bathing facilities such as swimming pools, spas, hot tubs and the like comprising:
    a housing having a plurality of narrow compartments through which a flow of water to be purified flows sequentially in upward and downward directions, said housing having a water inlet to a first of said compartments and a water outlet from a last of said compartments,
    an ultraviolet ozone generator in one of said compartments, said ozone generator comprising:
        an ultraviolet-transmissive housing in said flow of water,
        an ultraviolet lamp in said ultraviolet-transmissive housing,
    a chlorine generator comprising:
        a pair of electrolysis plates mounted in at least a portion of said water to be purified, and to which an electrolysis potential is applied,
        a supply of salt in said at least a portion of said water to be purified,
    a venturi having a plurality of suction ports, with said water to be purified developing a motive flow through said venturi, with at least ozone from said ozone generator provided to one of said plurality of suction ports;
    a first canister apart from said housing containing said pair of electrolysis plates, a second canister containing said supply of salt, said second canister coupled to said flow of water and controllably providing a salt solution to said first canister, said first canister coupled to another one of said plurality of suction ports and providing chlorine developed by electrolysis to said flow of water,
    wherein said housing is formed from a narrow square or rectangular extruded part, with interior walls of said extruded part forming said plurality of narrow compartments within said housing, with opposed sides of said extruded part capped to form side walls of said housing.

2. A water sanitizer as set forth in claim 1 wherein said compartments having a downward water flow are smaller in cross section so that said water flow is accelerated and said compartments having an upward water flow are larger in cross section so that said water flow is decelerated.

3. A water sanitizer as set forth in claim 2 further comprising turbulence-inducing devices mounted in at least one of said compartments.

4. A water sanitizer as set forth in claim 1 further comprising a water/gas separator in a last compartment of said compartments receiving said flow of water.

5. A water sanitizer as set forth in claim 4 wherein said water/gas separator coupled to one of said plurality of suction ports to return gas separated from said flow of water to said flow of water.

6. A water sanitizer as set forth in claim 1 wherein said housing is formed from a generally round extruded part, with said narrow compartments concentrically arranged about a central narrow compartment of said plurality of narrow compartments.

7. A water sanitizer as set forth in claim 6 wherein ends of said generally round extruded part are provided with end caps having channels therein to direct said flow of water serially in said upward and downward directions through said narrow compartments.

8. A water sanitizer as set forth in claim 7 wherein a one of said end caps is configured as a base for said housing, said base provided with a bore serving as said water inlet and communicating with a first of said plurality of narrow compartments, with an inlet portion of said venturi configured as a first insert in said bore and receiving said flow of water, an outlet portion of said venturi configured as a second insert in said bore and providing said flow of water to a first of said narrow compartments, with an interface disk between said first insert and said second insert being configured as a suction port.

9. A water sanitizer as set forth in claim 8 wherein said first insert, said second insert and said interface disk are replacable with different respective inserts and disks in order to adjust operational characteristics of said venturi.

10. A water sanitizer as set forth in claim 9 wherein said second insert is selected so that an opening therein receiving said flow of water from said first insert is larger than an opening providing said flow of water from said first insert.

11. A water sanitizer as set forth in claim 7 further comprising a water/gas separator in one of said plurality of narrow compartments.

12. A water sanitizer as set forth in claim 11 wherein said water/gas separator causes a water level in said one of said plurality of narrow.

13. A water sanitizer as set forth in claim 12 further comprising coupling a gas vent from said water/gas separator to a suction port of said venturi.

14. A water sanitizer as set forth in claim 13 wherein said gas vent is coupled to said suction port of said venturi via said ozone generator.

15. A water sanitizer as set forth in claim 14 wherein said one of said plurality of narrow compartments is said central narrow compartment of said plurality of narrow compartments.

* * * * *

UNITED STATES PATENT AND TRADEMARK OFFICE
CERTIFICATE OF CORRECTION

| | |
|---|---|
| PATENT NO. | : 7,186,334 B1 |
| APPLICATION NO. | : 10/701310 |
| DATED | : March 7, 2007 |
| INVENTOR(S) | : Ronald L. Barnes |

Page 1 of 1

It is certified that error appears in the above-identified patent and that said Letters Patent is hereby corrected as shown below:

At Column 14, claim 12, line 12 should read:

A water sanitizer as set forth in claim 11, wherein said water/gas separator causes a water level in said one of said plurality of narrow compartments to rise and fall a distance corresponding to a substantial length of said ozone generator so as to expose gas in said one of said plurality of narrow compartments to ultraviolet radiation from said ultraviolet lamp.

Signed and Sealed this

Twenty-third Day of October, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,186,334 B1 | Page 1 of 1 |
| APPLICATION NO. | : 10/701310 | |
| DATED | : March 6, 2007 | |
| INVENTOR(S) | : Ronald L. Barnes | |

It is certified that error appears in the above-identified patent and that said Letters Patent is hereby corrected as shown below:

At Column 14, claim 12, line 12 should read:

A water sanitizer as set forth in claim 11, wherein said water/gas separator causes a water level in said one of said plurality of narrow compartments to rise and fall a distance corresponding to a substantial length of said ozone generator so as to expose gas in said one of said plurality of narrow compartments to ultraviolet radiation from said ultraviolet lamp.

This certificate supersedes Certificate of Correction issued October 23, 2007.

Signed and Sealed this

Thirteenth Day of November, 2007

JON W. DUDAS
*Director of the United States Patent and Trademark Office*